United States Patent [19]

Roberts et al.

[11] Patent Number: 4,874,291
[45] Date of Patent: Oct. 17, 1989

[54] ROTOR ARRANGEMENT FOR A ROTORCRAFT

[75] Inventors: Bryan W. Roberts, Epping; Alan R. Fien, Ashfield; John Blackler, Picnic Point, all of Australia

[73] Assignee: University of Sydney, Sydney, Australia

[21] Appl. No.: 196,987

[22] Filed: May 20, 1988

[30] Foreign Application Priority Data

May 25, 1987 [AU] Australia ................................ PI2097

[51] Int. Cl.⁴ .............................................. B64C 27/08
[52] U.S. Cl. ........................................ 416/122; 416/19
[58] Field of Search .............................. 416/19, 122 R

[56] References Cited

U.S. PATENT DOCUMENTS

| | | | |
|---|---|---|---|
| 2,540,404 | 2/1951 | Neale | 416/122 X |
| 2,742,095 | 4/1956 | Pitcairn et al. | 416/19 |
| 3,074,487 | 1/1963 | Derschmidt | 416/19 |
| 3,762,669 | 10/1973 | Curci | 416/19 X |
| 3,873,049 | 3/1975 | Horsdal | 416/183 X |
| 4,025,230 | 5/1977 | Kastan | 416/11 UX |
| 4,027,999 | 6/1977 | Durno | 416/115 X |
| 4,274,808 | 6/1981 | Garner et al. | 416/114 |
| 4,297,080 | 10/1981 | Krauss et al. | 416/114 X |
| 4,362,085 | 12/1982 | Venuti | 416/115 X |
| 4,445,421 | 5/1984 | Walker et al. | 416/114 X |

FOREIGN PATENT DOCUMENTS

| | | | |
|---|---|---|---|
| 17802 | 1/1913 | France | 416/122 |
| 1268791 | 11/1986 | U.S.S.R. | 416/19 |
| 506404 | 5/1939 | United Kingdom | 416/122 R |

*Primary Examiner*—Everette A. Powell, Jr.
*Attorney, Agent, or Firm*—Pretty, Schroeder, Brueggemann & Clark

[57] ABSTRACT

A rotorcraft having four symmetrically disposed intermeshing rotors coupled to a common drive unit, each rotor having a single blade which is formed with a lifting surface and an oppositely projecting balance arm. The four rotors are coupled to the drive unit by respective rotor shafts and the shafts are inclined with respect to one another such that the path surface traced by each blade is inclined with respect to the path surface traced by each other blade. Each rotor is connected to its associated rotor shaft by way of a universal joint which provides for torque transmission and which permits blade flapping and blade pitch adjustment, and actuators are provided for applying differential collective pitch to the rotors by way of pitch control shafts.

9 Claims, 6 Drawing Sheets

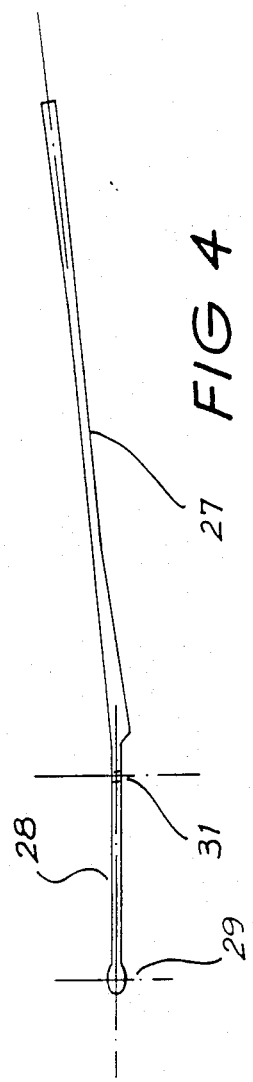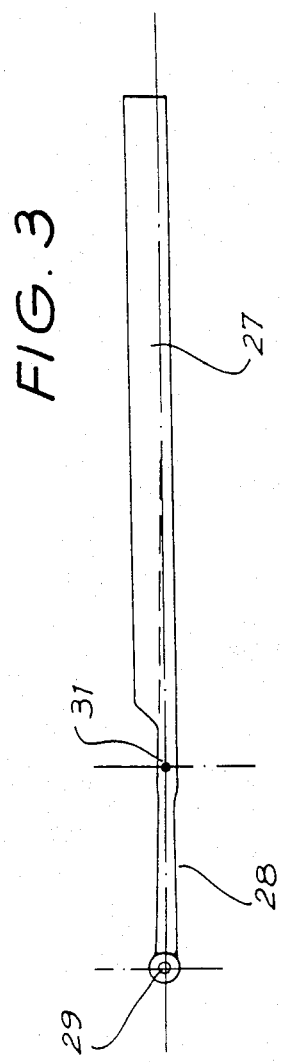

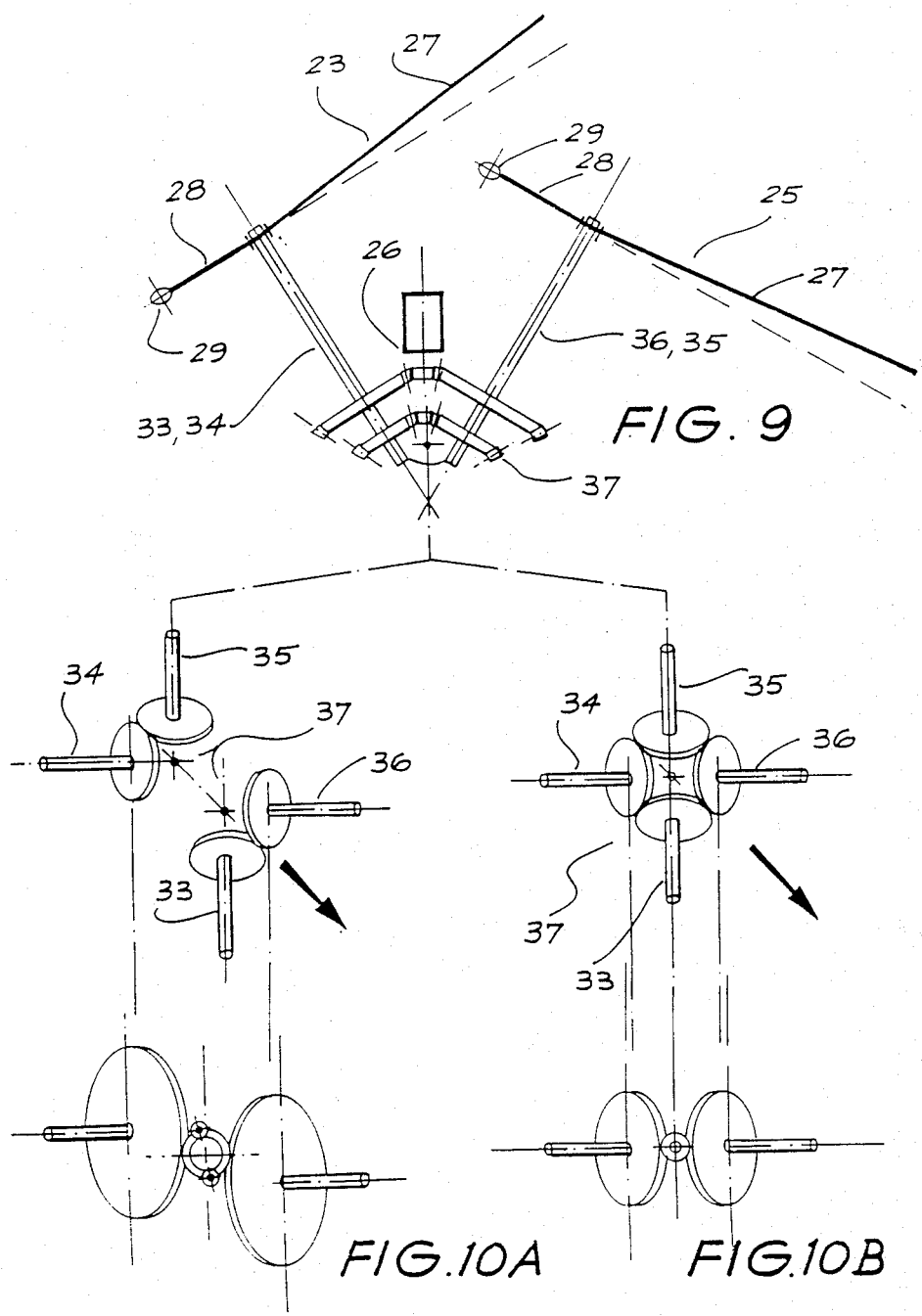

ROTOR ARRANGEMENT FOR A ROTORCRAFT

FIELD OF THE INVENTION

This invention relates to a rotor arrangement for a rotorcraft and in particular to an arrangement which comprises a plurality of intermeshing rotors having single lift surface blades.

The invention has broad application to various types of rotorcraft, including conventionally powered free flying helicopters, although it has been developed primarily for use in a craft which is intended to hover at the end of a tether. In the latter case the craft may be held aloft by the reaction between the rotors and high velocity winds or by motor drive applied to the rotors. Motor drive may be derived from an internal combustion engine or from one or more electric motors and, in the case of a tethered craft, energy may be supplied to the engine or motor by way of the tether. When an electric motor is employed to drive the craft aloft and the craft is placed in a suitable wind stream, the motor may be operated in a generating mode and be used to harness wind energy acting on the rotors. As an alternative, the craft, whether free flying or tethered, may be used simply to carry a sensor, such as a remotely controlled camera, or other device and, thus, the craft may be constructed in a size and manner appropriate to an unmanned craft.

Therefore, it is to be understood that the invention has broad application and need not be limited to use in conventional helicopters.

BACKGROUND OF THE INVENTION

Various types of multi-rotor craft are known, including one which incorporates two intermeshing, two-bladed counter-rotating rotors with a 90° phase difference between the rotors. Also, craft have been developed which use rotors having blades which have a single lifting surface, including one craft which uses two spaced-apart such rotors with separate drive units for each of the rotors.

SUMMARY OF THE INVENTION

In contrast with the above mentioned known craft, the present invention is directed to one which employs two or more intermeshing rotors, with each rotor having a single blade or, alternatively expressed, having a blade with a single lifting surface. This arrangement permits the construction of a craft having enhanced stability and durability and it facilitates simplification of control for the craft. It also facilitates a craft having mechanical rigidity, even with very low disc loading, and it provides for a compact drive to all rotors from a single power source or from a number of coupled power sources. Also, in the case of a craft having two only rotors, in contrast with the prior art the present invention permits the use of a wide range of phase angles between the rotors.

Thus, the present invention may be defined broadly as providing a rotorcraft having at least two intermeshing rotors coupled to a common drive unit. Each rotor comprises a single rotatable blade having a lifting surface and an oppositely projecting balance arm which is substantially non-lifting. The rotors are coupled to the drive unit by respective rotor shafts, and the shafts are inclined with respect to one another such that the path surface traced by each blade is inclined with respect to each other path surface. Each rotor is connected to its associated rotor shaft by way of a mechanism which provides for torque transmission and which permits blade flapping and blade pitch adjustment, and means are provided for adjusting the pitch angle of each blade.

PREFERRED FEATURES OF THE INVENTION

The rotor arrangement preferably incorporates four intermeshing rotors, with a preferred arrangement (as viewed in plan) being such that the rotors having diagonally positioned axes of rotation are disposed parallel to each other.

Drive preferably is transmitted such that the diagonally positioned drive shafts co-rotate and the adjacent shafts counter-rotate. That is, one pair of diagonally positioned rotors is driven to co-rotate in one direction and the other pair of diagonally positioned rotors is driven to co-rotate in the opposite direction.

The preferred four-rotor arrangement facilitates the employment of a relatively simple control system for the rotors, and the arrangement obviates the need for cyclic pitch control and complex mechanical systems which normally are required to effect cyclic pitch contrl. It is envisaged that collective pitch control only will be applied to the rotors, with differential such control being applied to various ones of the rotor in order to effect maneuvering of the craft.

The invention will be more fully understood from the following description of an electrically powered rotorcraft of a type which is intended to carry a video camera for use in aerial photography or the like. The rotorcraft is illustrated schematically in the accompanying drawings in which:

BRIEF DESCRIPTION OF THE DRAWINGS

In the drawings:

FIGS. 3 and 4 illustrate plan and side elevation views of a rotor which has been removed from an associated rotor shaft, FIG. 9 shows an arrangement for transferring drive to the rotor drive shafts from a single drive unit, and FIGS. 10A and 10B show alternative methods of transmitting the drive to the drive shafts from the drive unit.

DETAILED DESCRIPTION OF THE INVENTION

Figure 2:
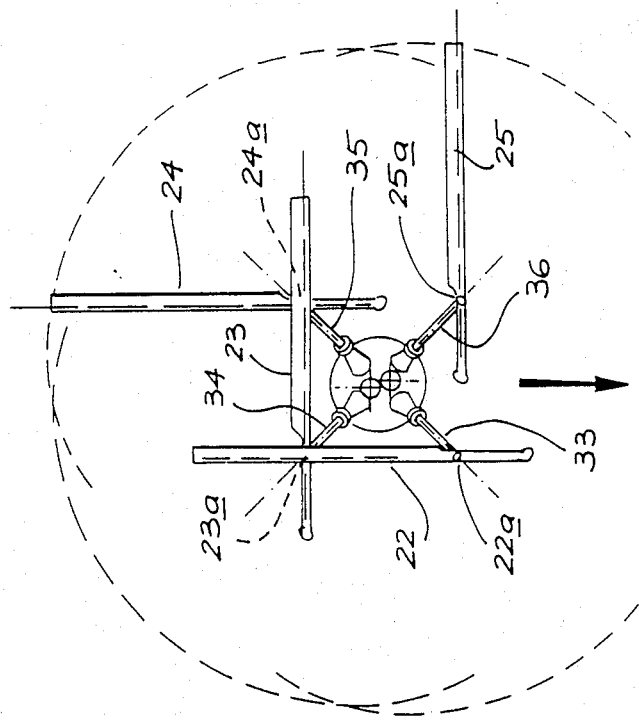
FIG. 2 shows a plan view of the craft as seen from above.
Figure 1:
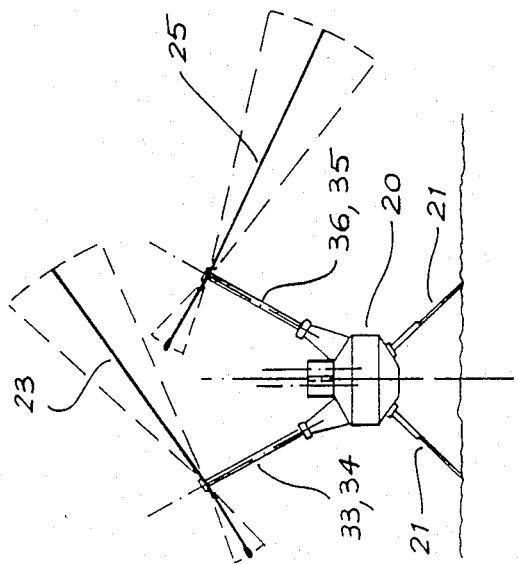
FIG. 1 shows a front elevation view of the craft.

As shown in FIGS. 1 and 2 of the drawings, the rotorcraft comprises a body portion 20 which is mounted upon pods or skids 21. The body portion houses a drive motor and associated equipment, to be referred to in more detail below, and it is intended to house a camera (not shown) for use in aerial photography or reconnaissance. The craft incorporates four intermeshing rotors 22 to 25 which are rotatable about inclined axes 22A to 25A respectively. The two rotors 22 and 24 lie parallel to one another and the other two rotors 23 and 25 lie parallel to one another. Thus, the rotors 22, 24 and 23, 25 that have diagonally positioned axes of rotation are disposed parallel to each other, and at four instants in time during each revolution the adjacent rotors will be disposed at right angles to one another, as shown in FIG. 2.

The dotted outline in FIG. 2 indicates the total area which is swept by the four rotors, and the dotted outline shown in FIG. 1 indicates the maximum flapping angle through which each rotor blade travels.

The arrow which is shown in FIG. 2 indicates the direction of intended forward travel of the craft. This direction is relevant in the context of the mechanisms shown in FIGS. 7 and 10 of the drawings and the arrows which are shown in the respective figures should all be taken as indicating one and the same direction of forward travel.

The four rotors 22 to 25 are coupled to a common drive unit 26 which is shown in FIG. 9, and each rotor comprises a single rotating blade 27 having an oppositely projecting (integrally formed) radial balance arm 28. The blade 27 is shaped with a single lifting surface to provide aerodynamic lift. The radial balance arm 28 does not have a lifting surface and it serves solely to carry a balance weight 29 which functions to balance centrifugal forces which exist in rotation of the rotor. The balance arm 28 preferably has a length in the order of 20% to 35% of the length of the blade 27 and it is expected that the length of the balance arm will never exceed 40% of the length of the blade.

Each of the rotors 22, 25 extends through and is clamped in a universal joint 30, which will be described below with reference to FIGS. 5 and 6, and the rotor is formed with an aperture 31 which is centred on the axis of rotation of the rotor. The aperture 31 is intended to provide clearance around a pitch control shaft 32 which projects through the aperture.

The rotors 22 to 25 are coupled to the drive unit 26 by respective drive shafts (i.e., rotor shafts) 33 to 36 and the shafts are inclined with respect to one another such that the path surface traced by each of the blades 27 is inclined with respect to each other path surface. Each of the shafts 33 to 36 is formed along at least a portion of its length as a tube so that it may accommodate the pitch control shaft 32, which extends longitudinally within the rotor shaft.

Various methods may be employed for imparting drive to the rotor shafts 33 to 36 from the drive unit 26, and one such method is shown schematically in FIGS. 9 and 10 of the drawings. Drive from the single drive unit 26 is imparted to all four of the rotor shafts by way of bevel gears 37. Two alternative approaches may be taken to the transmission of torque from the drive unit to the four rotor shafts 33 to 36, the preferred method being shown in FIG. 10A and a second method being shown in FIG. 10B. In the arrangement illustrated in FIG. 10A two separate points of intersection occur for the four shafts 33 to 36, whereas in the arrangement shown in FIG. 10B a single point of intersection exists for all four shafts.

Drive is transmitted to the shafts in such a manner that shafts 33 and 35 rotate in one direction and shafts 34 and 36 rotate in the opposite direction. That is, the adjacent shafts counter-rotate and the diagonally disposed shafts co-rotate.

Figure 5:
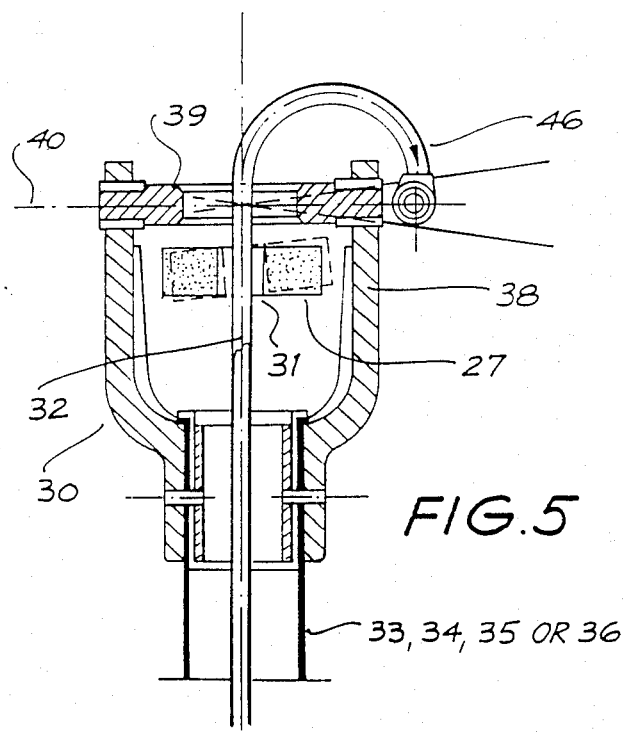
FIG. 5 shows an elevation view of an upper portion of a drive shaft and a universal joint mounted to the drive shaft.
Figure 6:
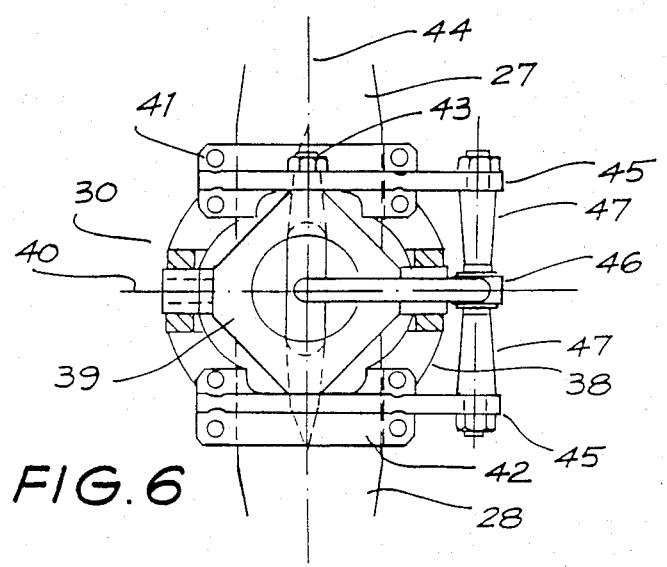
FIG. 6 shows a plan view of the arrangement shown in FIG. 5.

The universal joint 30 is fixed to the upper end of each of the rotor shafts 33 to 36 and, as shown in FIGS. 5 and 6, the universal joint has a yoke 38 which provides a trunnion mounting for a blade carrier 39. The blade carrier pivots about the yoke axis 40 and, thus, permits see-sawing pivotal (flapping) movement of the blade 27 and its oppositely projecting radial arm 28.

The blade 27 and radial arm 28 are connected to the blade carrier 39 by clamp members 41 and 42, and such clamp members are pivotably connected to the blade carrier 39 by way of pivot pin 43. This pivotal mounting allows the rotor blade 27 and the oppositely extending radial arm 28 to pivot about the longitudinal axis 44 of the rotor blade and, therefore, to adjust the pitch angle of the blade.

The clamp members 41 and 42 have laterally projecting lever arms 45 and the lever arms are connected to a terminal end 46 of the pitch control shaft 32 by a connecting elements 47. Rectilinear movement of the shaft 32 translates to pivotal movement of the lever arm 45 and, thus, upward and downward movement of the shaft 32 causes angular adjustment of the blade pitch.

Figure 7:
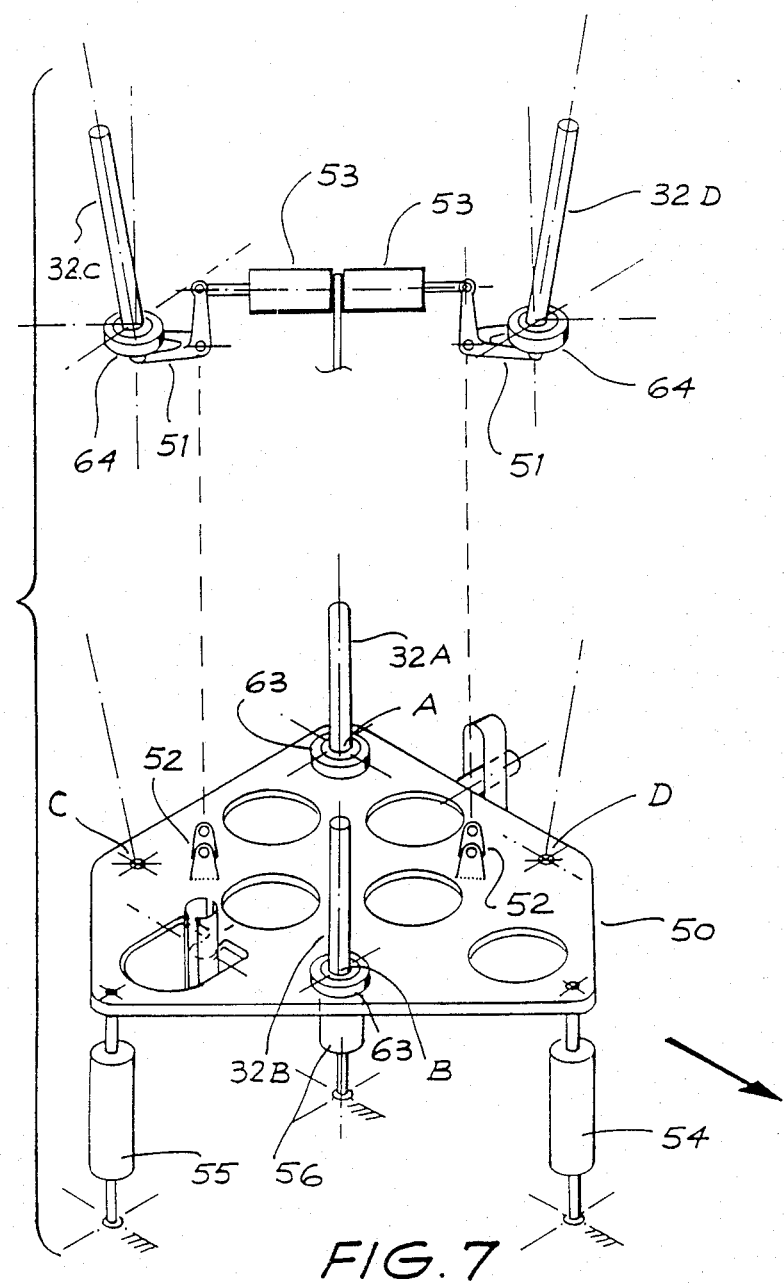
FIG. 7 shows a mechanism which may be employed for effecting pitch control over the four rotors shown in FIG. 2.

Various different mechanisms may be employed for imparting motion to the pitch control shaft 32 and one such mechanism is shown schematically in FIG. 7 of the drawings.

In the arrangement shown in FIG. 7, two of the blade pitch control shafts 32A and 32B are positively but rotatably connected by way of bearings 63 to a tilting plate 50 at points indicated by letters "A" and "B". The remaining two pitch control shafts 32C and 32D are rotatably connected to bell-crank levers 51 by way of bearings 64, and they meet (but are not directly connected to) the tilting plate at points "C" and "D".

The bell-crank levers 51 are pivotably connected to the tilting plate 50 by way of mounting arms 52, and the bell-crank levers 51 are connected to actuators 53. By operating the actuators 53, the pitch control shafts 32C and 32D are caused to move upwardly and downwardly with respect to the tilting plate 50.

The tilting plate 50 is itself supported by three further actuators 54, 55 and 56 which are located at the apices of a triangle. One of the rams 56 connects with a central point in the plate and the other two actuators 54 and 55 connect with the plate at peripheral points.

Uniform (simultaneous) actuation of all three of the actuators 54, 55 and 56 will result in collective pitch being applied to (or taken from) all four rotor blades. Also, differential collective pitch may be applied to the rotors by actuating any one or two of the three actuators 54 to 56. Thus, roll control of the craft may be exerted by the actuator 55, and pitch control of the craft may be exerted by actuator 54. Yaw control may be exercised by the actuators 53 and, of course, simultaneous actuation of a number of the actuators 53 through to 56 will result in compound movement of the craft.

Figure 8:
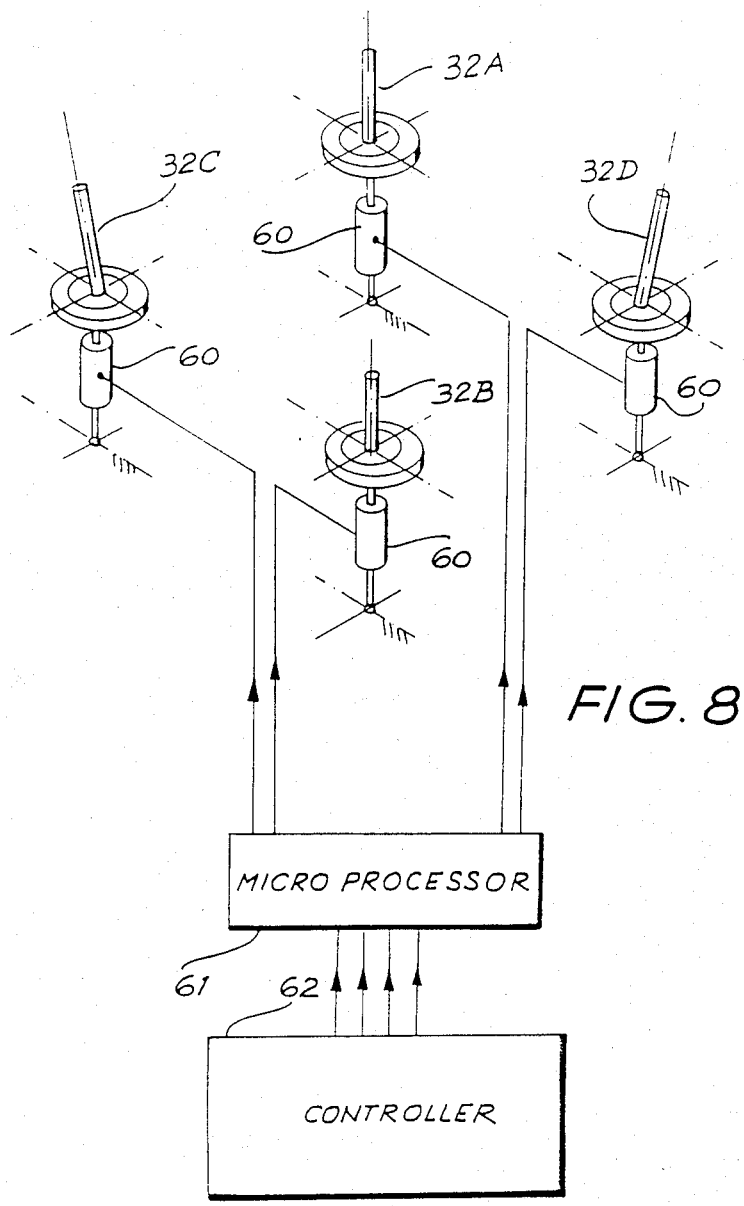
FIG. 8 shows a schematic representation of an (alternative) electronic control system for effecting pitch control over the four rotors.

As an alternative to the above described arrangements, the pitch control shafts 32 may be actuated by coupling each of the shafts to an associated actuator 60, as shown in FIG. 8. Operation of the actuators 60 is in this case controlled by a microprocessor 61 to which inputs are provided from a controller 62. The controller 62 may derive its inputs from pilot actuated levers and-/or pedals or from a remote transmitter.

As stated in the preamble of this specification, the rotorcraft in accordance with the invention has enhanced stability and controllability relative to the more conventional forms of rotorcraft.

It can be shown for hovering operation that partial stability can be maintained in a two-rotor version of the craft if relationship (1) is established and complete stability can be maintained in a four-rotor craft if relationship (2) is established:

$$h/1 \cos \epsilon = [(\bar{Z}w/\bar{X}u) - 1]/[(\bar{Z}w/\bar{X}u) + \cot^2 \epsilon] \qquad (1)$$

$$h/1 \cos \epsilon = [(\bar{Z}w/\bar{X}u) - 1]/[(\bar{Z}w/\bar{X}u) + \cot^2 \epsilon + \cosec^2 \epsilon] \qquad (2)$$

where:
- h = vertical height of rotor hubs above centre of gravity of the craft.
- 1 = virtual length of rotor shafts.
- $\epsilon$ = angle of inclination (with respect to vertical axis) of the rotor shafts.
- $\bar{X}u$ = in-situ drag damping derivative of the rotors with respect to the axis of no-feathering.
- $\bar{Z}w$ = in-situ vertical damping derivative of the rotors with respect to the axis of no-feathering.

We claim:

1. A rotorcraft having four intermeshing rotors coupled to a common drive unit, each rotor comprising a single rotatable blade having a lifting surface and an oppositely projecting substantially non-lifting balance arm, the rotors being coupled to the drive unit by respective rotor shafts and the shafts being inclined with respect to one another such that the path surface traced by each blade during rotation is inclined with respect to each other path surface, each rotor being connected to its associated rotor shaft by way of a mechanism which provides for torque transmission and which permits blade flapping and pitch adjustment, one diagonally positioned pair of the rotors being arranged to be driven so as to co-rotate in one direction and the other diagonally positioned pair of the rotors being arranged to be driven so as to co-rotate in the opposition direction, and means being provided for adjusting the pitch angle of each blade.

2. The rotorcraft as claimed in claim 1 wherein the rotor shafts are centered geometrically on the corners of a square.

3. The rotorcraft as claimed in claim 1 wherein the rotor shafts are disposed symmetrically at each side of the fore-aft center line of the rotor craft.

4. The rotorcraft as claimed in claim 1 wherein the rotors which have diagonally positioned axes of rotation are, as viewed in plan, disposed parallel to each other.

5. The rotorcraft as claimed in claim 1 wherein the balance arm of each rotor has a length not greater than 40% of the length of the oppositely projecting blade and wherein the balance arm is fitted with a balance weight which balances the centrifugal force of the blade during rotation of the rotor.

6. The rotorcraft as claimed in claim 1 wherein the balance arm and blade portions of each rotor are formed as an integral structure, wherein an aperture is formed within the rotor in alignment with the axis of rotation of the rotor, and wherein the means for adjusting the pitch angle of each blade projects through the aperture.

7. The rotorcraft as claimed in claim 1 wherein the mechanism which connects each rotor to its associated rotor shaft comprises a universal joint, the univeral joing having a yoke connected to the rotor shaft, a rotor carrier which is pivotably mounted to the yoke in a manner which permits blade flapping motion and clamp members securing the rotor to the rotor carrier, the clamp members being pivotably mounted to the rotor carrier in a manner which permits adjustment of the blade pitch angle.

8. The rotorcraft as claimed in claim 7 wherein the clamp members have projecting lever arms which are connected with the means for adjusting the pitch angle of each blade, whereby rectilinear motion of said means translates to angular adjustment of the blade pitch.

9. The rotorcraft as claimed in claim 1 wherein the means for adjusting the pitch angle of the blades include pitch control shafts which are located one within each of the rotor shafts, wherein each pitch control shaft is moveable in a rectilinear direction to transfer pitch adjustment motion to the associated blade and wherein drive mechanisms are coupled to the pitch control shafts for imparting differential collective pitch adjustment motion to each of the pitch control shafts.

* * * * *